UNITED STATES PATENT OFFICE.

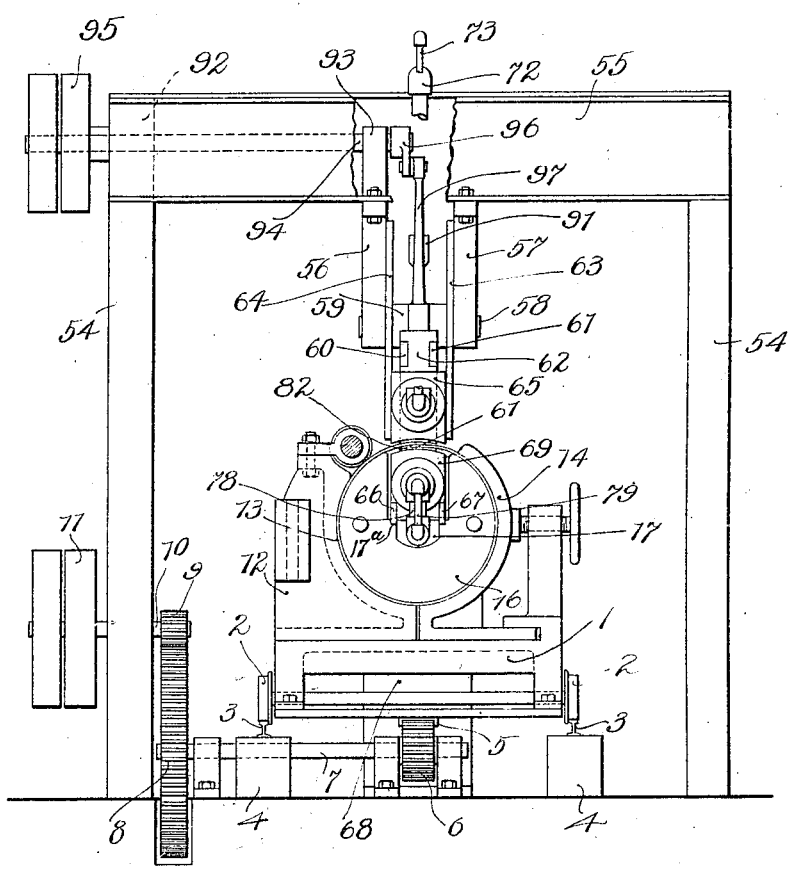

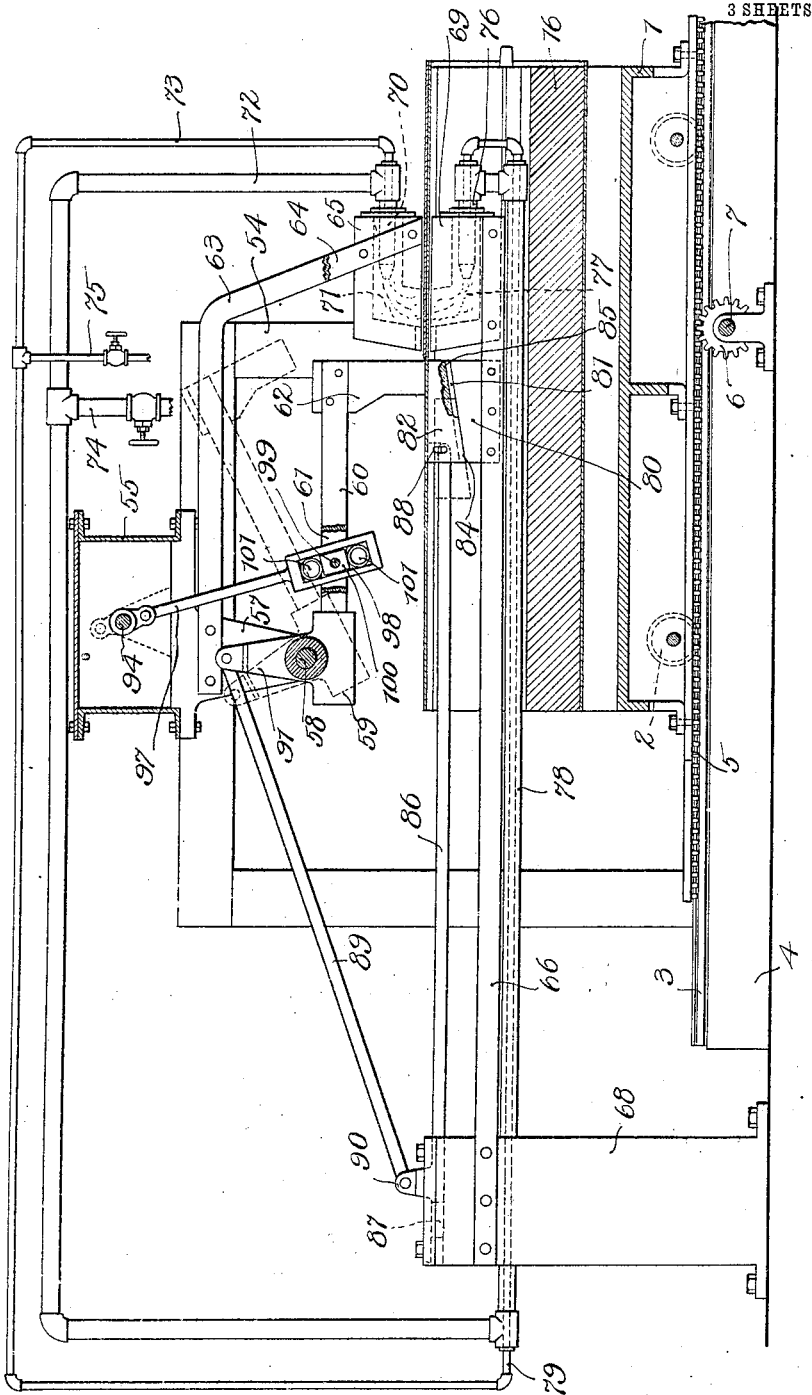

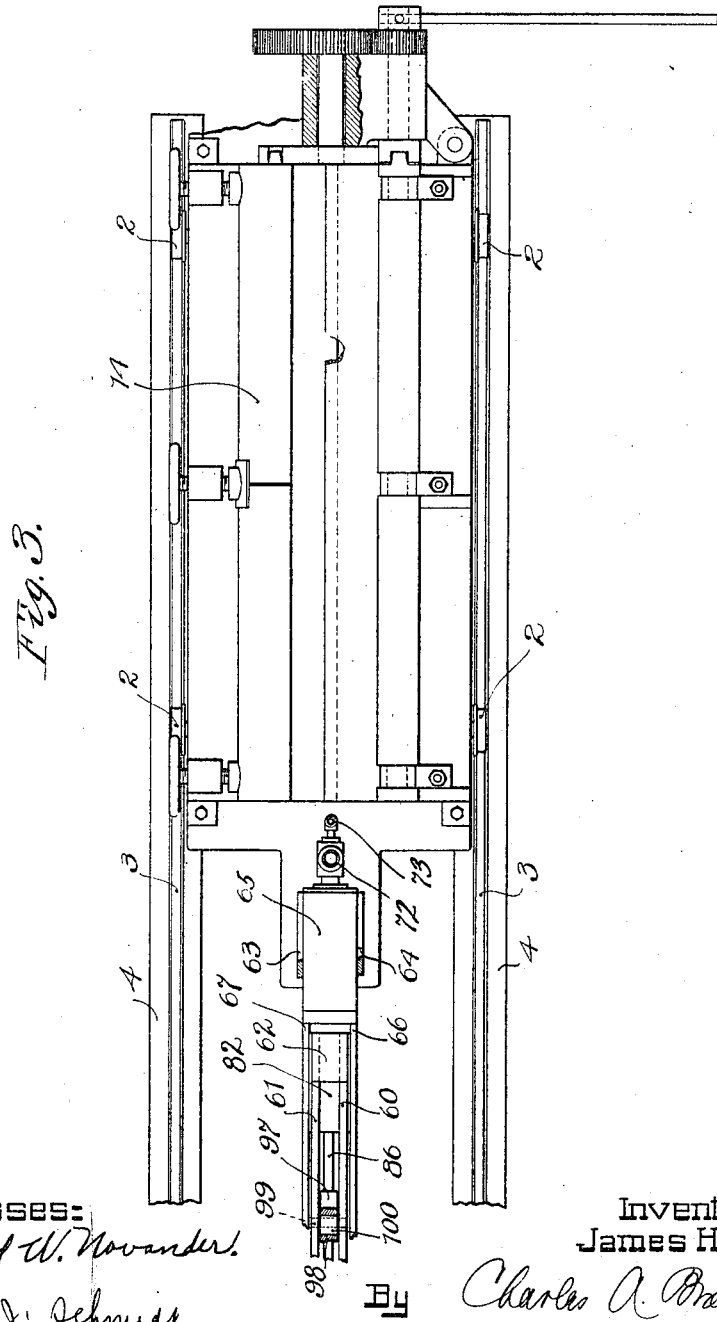

JAMES HALL TAYLOR, OF CHICAGO, ILLINOIS.

WELDING-MACHINE.

949,860.

Specification of Letters Patent.    Patented Feb. 22, 1910.

Application filed July 10, 1905. Serial No. 268,987.

*To all whom it may concern:*

Be it known that I, JAMES HALL TAYLOR, citizen of the United States, residing at Chicago, in the county of Cook and State of Illinois, have invented a certain new and useful Improvement in Welding-Machines, of which the following is a full, clear, concise, and exact description, reference being had to the accompanying drawings, forming a part of this specification.

My invention relates to welding machines, patricularly to machines for welding edges of sheet material.

It is a very difficult problem to weld edges of thin sheet material, owing to the rapidity with which the material cools from the welding point upon coming in contact with the anvil. Many modifications have been employed for overcoming this difficulty, for instance, machines are employed in which two hammer parts are moved toward and away from each other and between which the material to be welded is passed. Machines of the prior art of this kind, however, have been very complicated and adapted for welding the material only in the form of sheets, it being impossible with these prior machines to weld the material in the shape of hoops or pipes. Other machines have also been employed for use in welding large cylindrical objects such as boilers or cylinders, in which a large anvil structure passes inside of the object and is brought into and out of engagement with the parts to be welded. Machines of this kind also are inadequate for welding smaller objects, such as bands or pipes, and also require very complicated construction, and it is, therefore, the object of my invention to provide a machine of much more simplified construction and arrangement which is adaptable for welding thin material in the form of sheets and particularly in the form of bands or pipes, the main feature of the invention being means whereby the areas to be welded are out of contact with any cooling surface until the welding blow is received thereby.

The various features of my invention will be best understood by reference to the accompanying drawing, in which—

Figure 1 is an end view of the apparatus. Fig. 2 is a side elevation thereof, parts being shown in section, and Fig. 3 is a top view of the apparatus showing the carrier in position before the furnace.

A traveling carrier frame 1 is mounted on wheels 2—2 adapted to roll over rails 3—3 supported on bed timbers 4—4. Below this carrier frame is supported a rack bar 5 to be engaged by a pinion 6 connected through shaft 7 with the gear wheel 8 which is engaged by the driving pinion 9 secured to the shaft 10, which shaft may be actuated by the driving pulley 11.

On one side of the carrier frame is supported a stationary upright wall member 12 presenting an inner semi-cylindrical face 13. At the opposite side of the carrier frame are supported one or more adjustable upright wall frames 14 presenting the inner semi-cylindrical faces 15, the members 12 and 14 coöperating to form a cylindrical pocket for the reception of the cylindrical forming barrel 16 about which the sheet metal is formed. This barrel is provided with the longitudinal channel 17.

The frame for supporting the heating and welding apparatus consists of the side supports 54 and the top supporting member 55, this frame-work forming a bridge over the track along which the carrier frame travels. Suspended from the member 55 are the bearing arms 56 and 57, through the ends of which passes the shaft 58 receiving the journal frame 59 from which extend the side bars 60 and 61, between the forward ends of which is secured the hammer 62. Bars 63 and 64 are bolted to the bearing arms 56 and 57 and extend forwardly and downwardly as best shown in Fig. 2, being secured at their ends to the upper half of the furnace 65. Bars 66 and 67 extend horizontally forward from the standard 68 and are secured at their forward end to the lower part 69 of the furnace. The burner 70 extends into the combustion chamber 71 of the upper furnace part, and the combustion chamber is formed to deflect the fire and heat downwardly. This burner is supplied from the air pipe 72 and fuel pipe 73 connecting with the supply pipes 74 and 75. The burner 76 extends into the combustion chamber 77 of the lower furnace part and this chamber is shaped to deflect the heat and fire upwardly to meet the fire deflected downwardly from the upper combustion chamber, thus forming a region of intense heat between the outlets of the two combustion chambers, the distance between the two furnace members being just sufficient to allow passage therethrough of the overlapping edges to be welded. The burner 76 is fed through the pipes 78 and 79 which extend rearwardly directly below the central line of the lower furnace part and at the rear of the standard 68 pass upwardly and forwardly to connect with the supply pipes 74 and 75.

Immediately to the rear of the furnace is an anvil block 80 which may be securely bolted to the bars 66 and 67, the upper surface of this anvil block being provided with a track or guide 81. Resting on this block is the movable anvil 82, whose under surface 84 is provided with a groove 85 for receiving the track or guideway 81. The upper surface of the anvil 82 may be grooved to fit the curvature of the pipe shell, or may be any other shape to accommodate itself to the surface of the material to be welded. A rod 86 at its rear end may slide in the guide way 87 at the top of the standard 68, and the front end of this rod is pivoted in the slot 88 cut in the anvil 82. A connecting link 89 is pivoted at the upper end of the arm 90 extending from the end of the rod 86 and at its other end is pivoted to the end of the arm 91 extending upwardly from the journal box 59 engaging the shaft 58. Thus as the hammer is moved up and down the anvil through the rods 86 and 89 will be moved back and forth. The upper surface of the anvil block 80 may also be inclined rearwardly, as best shown in Fig. 2, and the lower surface of the anvil part 82 may be inclined correspondingly, and thus as the anvil part 82 is moved back and forth by the rod 86, it will also move up and down, the combined effect being a diagonal reciprocation.

Carried in the bearings 92 and 93 is a shaft 94 extending through the supporting frame 55. This shaft may be turned by means of the pulley 95, and at its inner end is secured a crank arm 96 pivoted to the end of the connecting rod 97, which connecting rod terminates in an elongated slot 98. Extending between the side rods 60 and 61 of the hammer arm is a pivoted shaft 99 to which is pivoted the block 100 disposed within the groove 98. At either side of this block and between the block and the inner walls of the bearing are rubber or spring cushions 101 which afford a yielding connection between the actuating shaft 94 and the hammer arm, this being necessary on account of the varying thicknesses of the welded portion between the hammer and anvil.

The coöperation of the various apparatus now becomes apparent. The carrier frame is at first removed from the other apparatus, as shown in Fig. 3, and when thus removed the blank is rolled about the barrel, and the edges brought to the proper overlapping position preparatory to being welded together. The driving adjustment for the pulley 11 is adjusted to advance the carrier frame toward the furnace. The channel 17 receives the piping 78 and 79, the lower furnace member, the anvil block and the anvil, the side rods 66 and 67 engaging on the ledges 17ª and thus the barrel and carrier frame will help to support the lower furnace member and the anvil block, and will receive the impact of the hammer blows on the movable end. The speed with which the carrier is moved is such that the furnace is given sufficient time to heat the overlapping edges to the proper welding temperature, and the heated area passes from the furnace to be successively struck by the hammer which is actuated with sufficient rapidity from the driving pulley 95 and the intervening mechanism. As the hammer is reciprocated up and down upon actuation of the driving pulley 95, the arm 91 is rocked and the anvil 82 consequently reciprocated back and forth. The adjustment between the hammer, the anvil and the connecting links is such that the anvil 82 will not be in engagement with the particular area to be welded until the hammer engages the area to give a welding blow, the anvil being then immediately removed from the area upon ascent of the hammer. By the expression "area to be welded" or "part to be welded" is meant that section just outside the mouth of the furnace which is at the proper welding temperature and about to be struck by the hammer. If the engaging surfaces between the anvil and block be horizontal, the top of the anvil will slide horizontally into position below the area to be struck, but owing to the rapidity of action, the contact will be for so short a time that there will practically be no transfer of heat from the area to be welded to the anvil and welding will be perfect.

When the engaging surfaces of the block and anvil are inclined as shown, the duration of contact, of course, would be greatly decreased, but in some cases it would be more advantageous to have the engaging surfaces horizontal. Thus there is no possibility of heat being conducted away from the edges by the anvil, and this is one of the important features of my invention. If the anvil remained in contact with the area for any length of time whatever, sufficient heat would be conducted from the edges to reduce the temperature below the welding point before the hammer would strike, and welding, therefore, would not take place or would be imperfect. The adjustment of the speed of the various parts is such that each section of the area to be welded is given a sufficient number of blows to cause thorough welding thereof and to reduce the section thereof to the proper dimensions.

After the overlapping edges have been welded together throughout the entire length of the pipe the apparatus is stopped and the finished pipe may be withdrawn from about the barrel.

It is evident that the apparatus of my invention may be employed for welding other objects besides pipes. The edges of the sheets or bars, for instance, may be welded together and may be passed manually through the furnace and below the hammer, or may be secured in any convenient manner to the carrier frame. After the objects to be welded are placed in position on the carrier frame, the machine becomes entirely automatic in its operation requiring very little attendance. The machine is very simple in construction and arrangement, and the parts are so shaped and associated that pipes or tubes of comparatively small diameter can be welded.

Other arrangements and modifications will suggest themselves without departing from the spirit of the invention, and I do not, therefore, wish to be limited to the exact arrangement disclosed.

The statements in the specification and claims that the movable anvil is in contact with the area to be welded only at the time or instant that the welding blow is struck should be construed relatively.

Although the anvil may pass throughout its length in contact with the area to be welded still the speed is so great that as far as cooling effects are concerned the contact may be said to be instantaneous.

I desire to secure by Letters Patent:

1. In a welding machine, the combination of a stationary anvil part, an associate anvil part adapted to be reciprocated on the stationary part and across the top thereof, a hammer over the stationary anvil part, driving means adapted to cause reciprocation of the hammer toward and from the stationary anvil part, and means controlled by the movement of the hammer adapted to cause the associate anvil part to be moved away from the striking area of the hammer as the hammer is moved away and back under the striking area of the hammer as the hammer is moved toward the stationary anvil part.

2. In a welding machine, the combination with a heavy anvil part, a lighter anvil part adapted to be reciprocated over the top of the heavy anvil part, a hammer over the heavy anvil part, driving means adapted to cause vertical reciprocation of the hammer toward and from the anvil members, and means controlled by the movement of the hammer adapted to cause the lighter anvil part to be moved on the heavy anvil part to a position under the striking area of the hammer as the hammer is lowered and to be moved away from the striking area of the hammer as the hammer is raised.

3. In a welding machine, the combination with a heavy anvil part having its upper surface slightly inclined, a lighter anvil part adapted to be reciprocated over the inclined surface, the said inclined surface being inclined to the path of reciprocation and the lighter anvil part thereby raised and lowered, a hammer over the lighter anvil part when in its raised position, driving means adapted to cause vertical reciprocation of the hammer toward and from the anvil member, and means controlled by the movement of the hammer adapted to cause the lighter anvil part to be moved out of operative position as the hammer is raised and back to operative position as the hammer is lowered.

In witness whereof, I hereunto subscribe my name this 7th day of July A. D., 1905.

JAMES HALL TAYLOR.

Witnesses:
CHARLES J. SCHMIDT,
LEONARD W. NOVANDER.